Figure 1:
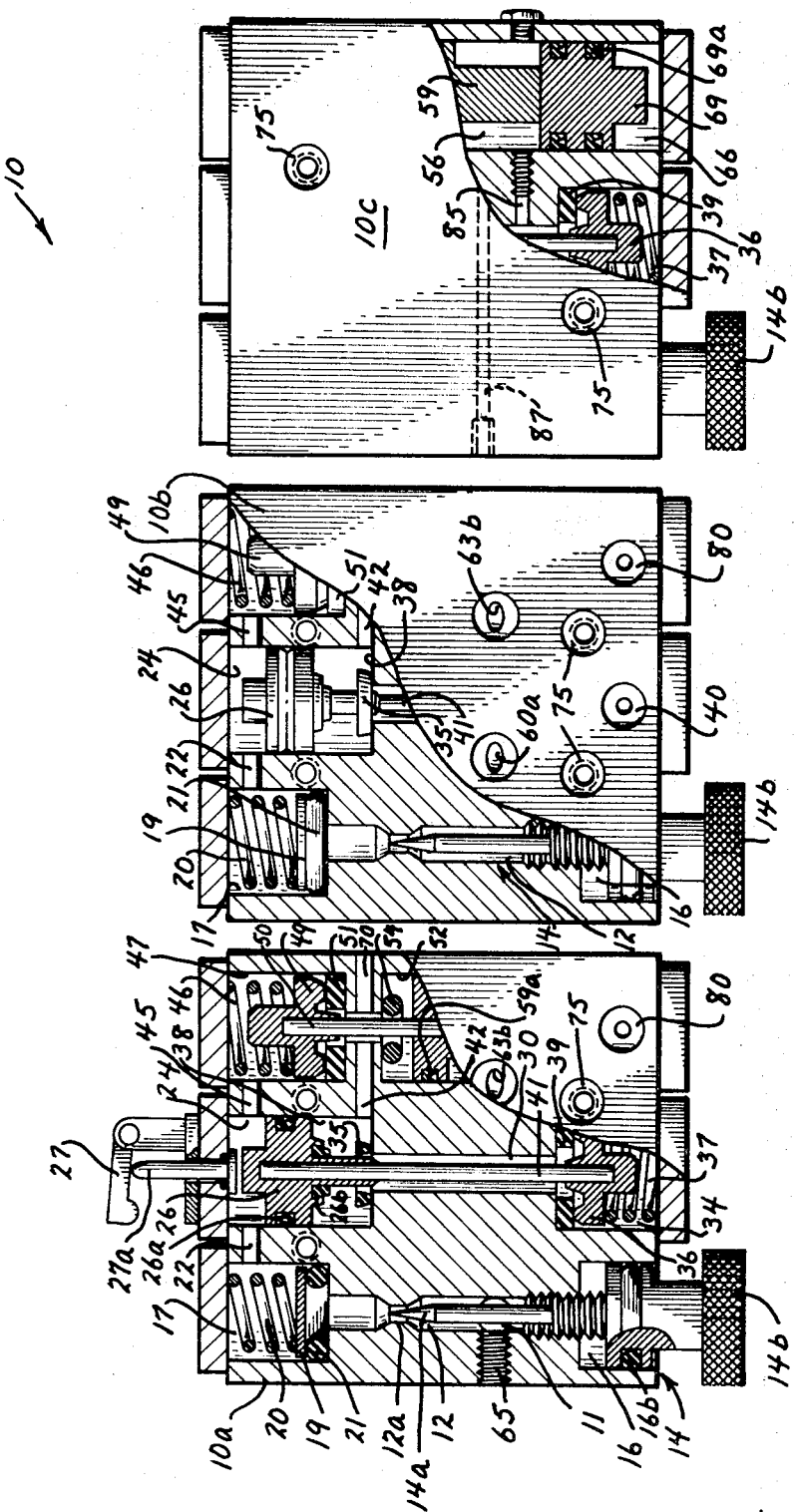

United States Patent

[11] 3,543,794

[72] Inventor Joe Stewart, Jr.
 McLeansboro, Illinois 62859
[21] Appl. No. 705,096
[22] Filed Feb. 13, 1968
[45] Patented Dec. 1, 1970

[54] PROGRAMMER
 6 Claims, 2 Drawing Figs.

[52] U.S. Cl. .................................................. 137/624.14
[51] Int. Cl. .......................................................... F15b 21/02
[50] Field of Search ............................................ 137/102,
 106, 624.14; 91/36, 412

[56] References Cited
 UNITED STATES PATENTS
 1,985,589 12/1934 Ter Meer ....................... 91/36

2,068,102 1/1937 Gaines ......................... 91/36X
 3,332,443 7/1967 Mize ......................... 137/624.14

Primary Examiner—Robert G. Nilson
 Attorney—Warren D. Flackbert

ABSTRACT: A programmer characterized by a grouping of independent control units operated in response to fluid pressure to achieve the sequential programming of various mechanical function, and including metering means for controlling the time at which a succeeding control unit functions with respect to a preceding control unit, as well as an arrangement for "holding" one or more of the aforesaid mechanical functions.

INVENTOR.
JOE STEWART, JR.
BY
Hansen D. Harbert
ATTORNEY

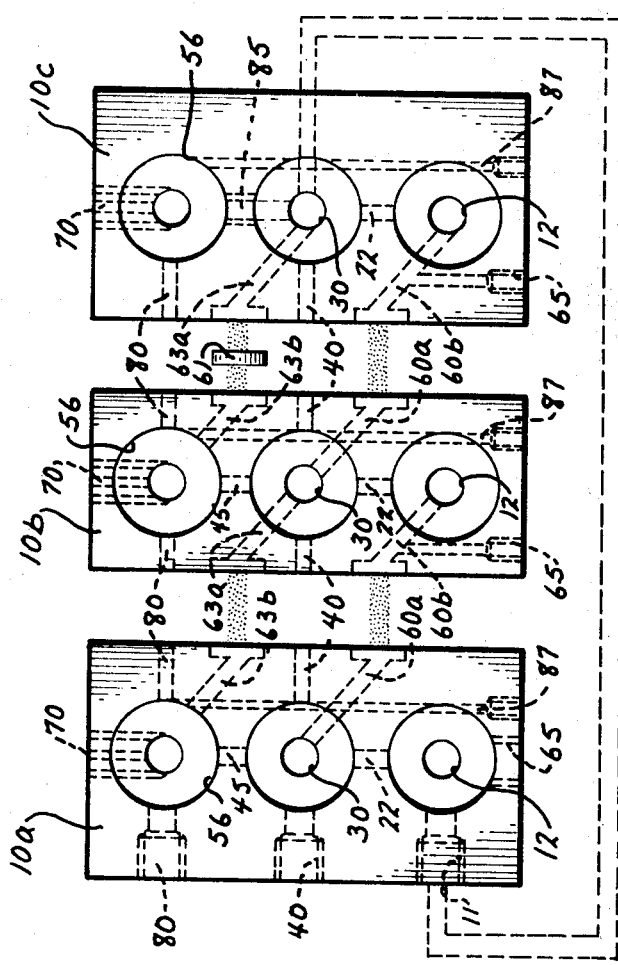

PROGRAMMER

As is known, it is desirable to automatically control the sequence of manufacturing events in the production of any given article. Such controlled functions might be, by way of example, the milling, turning, finishing, drilling, cutting, routing, or the like of a workpiece. Sequential controlling or programing of an article under mass production results in economic advantages, including faster production, less labor requirements and higher utilization of equipment.

The invention provides a versatile programing device operated by fluid pressure means, such as from a commonly known hydraulic system or pressurized air, for example. The programer comprises a series of assembled independent control units or fluid-sensitive valves, each of which govern a manufacturing cycle, or, at least, the recycling of programing action. The control units are each substantially the same insofar as internal arrangement is concerned, one unit governing the operation of the next succeeding unit to accommodate a desired operational schedule. The timing required for programing can be readily adjusted through metering means in each control unit, and the overall structure may be so arranged as to be continually automatic, i.e. operable without the necessity of manual control for initiating the overall sequence, or, at the other extreme, operation may be terminated after one full sequence of the assembled control units is completed.

Importantly, the invention readily permits one or more units to remain in a "hold" condition, through a simple modification during the assembly procedure. The programer defining the invention is a precision device, versatile in performance, and readily adaptable for various functions to be controlled through the use of any number of interconnected control units.

A better understanding of the present invention will become more apparent from the following description, taken in conjunction with the accompanying drawings, wherein:

FIG. 1 is a view in side elevation, partly fragmentary and partly in cross section, showing a typical programer in accordance with the invention, the arrangement of control units being shown side by side for ease in understanding; and FIG. 2 is a top plan view of the overall unit of FIG. 1, with the tops of each section removed, and being partly diagrammatic, showing the individual units oriented into an exploded assembled relationship for reasons of clarity.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the FIGS, and first with respect to FIG. 1 the programer defining the invention 10 comprises a series of assembled individual control units or fluid-sensitive valves 10a, 10b and 10c. In that the internal arrangement for each of the aforesaid control units 10a, 10b and 10c is the same, except for some additions in the first and last control units, and for ease in understanding, the same reference numerals will be used to designate the same components where applicable.

As a matter of further orientation, and as will be more apparent in FIG. 2, the control units 10a, 10b and 10c are assembled in a stacked relationship, i.e. control unit 10a is the first unit, control unit 10b is the second or middle unit, and control unit 10c is the third or last unit. Actually, in FIG. 1, the control unit 10b is placed on the control unit 10a, and the control unit 10c is placed on the control unit 10b, to achieve the plan relationship of FIG. 2. Any number of control units may be interposed between the first control unit 10a and the last control unit 10c, but only one is shown in the drawings for reasons of clarity.

As will become apparent from the discussion herein, the second through the last control unit each program different manufacturing or other desired functions and the number employed depends upon the overall programing operation. The last control unit or fluid-sensitive valve may be adapted to terminate a complete operational sequence of all assembled control units, or, in the alternative may serve to automatically cycle the first control unit to achieve control functioning in the next succeeding control units. In the instance of such automatic operation, the first control unit also serves to control a manufacturing function.

In any event, while the internal arrangement of each of the control units is the same, the actual assembling, or bolting together is different. The first control unit differs from the other control units in that it includes cycling components, while the last control unit provides a "bleed" path for effecting exhaust in a nonautomatic arrangement.

Considering first control unit 10a and looking into the side thereof, as in FIG. 1, and, where applicable, looking into the sides of control units 10b and 10c in FIG. 1, pressurized fluid, such as an hydraulic fluid or air, is introduced into the unit through a passageway 11, the latter having an internally threaded portion for receiving a one-way band check valve (not shown) through which the fluid passes. The passageway 11 communicates with another passageway 12, typically normal therewith, and also having a threaded portion for receiving a rotatable metering means, such as a common needle valve 14 with a needle portion 14a and a control knob 14b. The passageway 12 has a restricted portion 12a to effect metering action due to movement of the aforesaid needle portion 14a. A cavity 16 is provided into which the aforesaid control knob 14b is adapted to move, where sealing means, such as an O-ring or gasket 16b, provides a fluid seal, preventing passage of fluid through the control knob assembly.

The passageway 12, beyond the restricted portion 12a thereof, communicates with a cavity 17 which receives a check valve 19, the stem 19a of which is normally forced into a nonfilling position by reason of a compression spring 20. The assembly is completed through the use of a conventional gasket or O-ring 21. The cavity 17 for the check valve 19 communicates with another cavity 24 in the unit through a passageway or duct 22. A piston 26 is movable within the cavity 24, either by reason of fluid pressure, in the instance of all control units 10a, 10b and 10c, or, in the instance of the first control unit 10a, may also be movable by reason of a normally nonoperative pivotal lever 27 which selectively moves an associated plunger 27a.

In starting or initiating a sequential control cycle, the aforementioned one-way check valve connected into passageway 11, may, in turn, be connected to a hand-controlled fluid valve for semiautomatic operation of the programer. In other words, manual action is required to achieve the programing sequence. On the other hand, use of the pivotal lever 27, and associated plunger 27a, is adapted for cycling the automatic operation of the programer thereafter being continued through fluid pressure from the last control unit, to be discussed below.

In any event, the piston 26 includes customary gasket or sealing means 26a for blocking unwanted fluid flow from the cavity 24. The piston 26 connects to another piston 36 through a pin member 41, the latter being movable within another fluid-carrying cavity or passageway 30, serving as a control cavity. The piston 36 is movable within a cavity 34 which also communicates with the aforesaid passageway 30. A compression spring 37 continually urges the piston 36 into a sealed relationship with a conventional seating member 39. Openings 40, communicating with cavity 34 from opposite sides of the control units (except on one side of the last control unit), provides a continual fluid pressure in cavity 34 in all control units, where such pressurized fluid is introduced from an outside source (not shown).

The overall assembly of piston 26 is completed through a sealing member or O-ring 26b which selectively cooperates with an O-ring 35 disposed around the pin member 41 on the bottom of an enlarged space 38 below the piston 26 which communicates with the duct or passageway 30. In other words, when the piston 36 is in the position of the drawings, due to action of the spring 37, fluid may pass from duct 30 and into the space 38, and conversely when O-ring 26b is sealed with O-ring 35.

The latter occurs when the piston 26 is moved from its normal position of the drawings, by reason of fluid pressure, or, initially, with automatic operation, upon use of the pivotal lever 27. An exhaust passageway 42, perhaps three parallel openings in number, provides part of an exhaust path from the enlarged space 38 to the outside of each unit, when the piston 36 is in the position of the drawings.

A duct or passageway 45 is provided to permit communication between the cavity 24 and another cavity 47, the latter receiving a slidable piston 49 having a pin member 50 connecting such to another piston 59. A compression spring 46 continually urges the piston 49 into a sealing relationship with a seat 51.

A cavity 52 is provided along which the piston 59 is slidable, where a bumper 54 is selectively engaged by the piston 59. Piston 59 also has sealing or gasket means 59a associated therewith.

Another slidable piston 69 is provided adjacent piston 59, having sealing or gasket means 69a associated therewith. A space 56 is defined between a portion of piston 59 and piston 69, while another space 66 is defined between a portion of piston 69 and a wall of each control unit. Another passageway or duct 70, together with passageway or duct 42, forms the complete exhaust port, portion 42 of which was mentioned above. Openings 80 in opposite side surfaces of each control unit, except one surface of the last control unit, communicate with space 66, where such openings 80 are in alinement between the respective control units, so that fluid pressure can be introduced therethrough, to be discussed below.

The individual control units are typically connected through bolts screwed into threaded openings 75 (only a few of which are shown), and as particularly apparent from FIG. 2, an angling passageway 60a, in one control unit, and an angling passageway 60b in another control unit, combine, through gasket means (not shown), to define a fluid path from cavity 30 to the passageway or cavity 12 around the needle valve 14 in the next succeeding control unit which connects to a mechanism (not shown) for effecting an operational cycle, typically through a passageway or job port 65. Job port 65 may, if desired, communicate with passageway 60b or with cavity 12.

In other words, and as should become apparent, the preceding control unit drives the next succeeding control unit to perform the programed job, except the last control unit, when in nonautomatic operation. On the other hand, an angling passageway 63a, in one control unit, and an angling passageway 63b, in an adjacent control unit, together with gasket means (not shown), permit fluid passage from passageway 30 in one control unit to the space 56 in the preceding control unit, serving, to be discussed, an exhaust function.

Thus, while one control unit triggers the job function of the next succeeding control unit, such next succeeding control unit triggers the exhaust of the prior control unit, excepting the first control unit where no exhaust function is necessary during the first cycle. Importantly, in order to hold any particular sequence of the programing a fluid-blocking disk 61 may be inserted in passageway 63a—63b, preventing fluid flow and, therefore, the exhaust necessary for further operation of the prior control unit, "holding" such control unit to a working function, all to be discussed below.

With reference to the last control unit 10c, a duct or passageway 85 is provided between passageway 30 and space 56, and during automatic operation such is blocked by a plug (not shown). In order to effect exhaust action for the last control unit during nonautomatic operation, the passageway 85 is unplugged, or partially unplugged (for slower exhaust), also to be discussed below.

Each of the control units also includes a passageway or duct 87 between an outside wall of the unit and the space 56, such being provided to release a "hold" condition, through, typically, the diversion of some intake fluid pressure to the control unit. Typically, the passageway 87 has a fitting (not shown) at its outside opening.

In use, and after introducing fluid into the first control unit 10a, as by a hand operation, with semiautomatic use, fluid enters duct 11, the passageway 12 around the needle portion 14a of needle valve 14, serving as an inlet cavity, the restricted portion 12a of passageway 12, and into a pressured relationship with the check valve 19, the latter moving against the force of spring 20. The fluid then passes into cavity 17, through duct 22, and into cavity 24, and from the latter to cavity 47 through duct 45.

When cavities 17, 24 and 47 have sufficient pressure to overcome spring 37 bearing against piston 36, the latter moves, as does pin member 41 and piston 26, so that the sealing or gasket member 26b comes into contact with the seat 35. At this time, and typically through a ⅛ inch travel of pin member 41, piston 36 is spaced apart from seat 39, permitting fluid flow from cavity 34 to passageway 30, and the first operational phase is completed of a given control unit.

In the event of automatic operation, the preceding use of the hand valve is omitted, and pivotal lever 27 on the first control unit 10a is activated, forcing plunger 27a onto piston 26, where, again, piston 36 moves through pin member 41. Such action allows fluid in cavity 34 to pass therefrom to passageway 30, considering that there is no longer a seated or sealed relationship between piston 36 and seat 39, and the fact that the cavity 34 also has fluid pressure thereon, due to communication with the main source of fluid supply and the openings 40 therebetween.

The fluid from cavity 34 flows along passageway 30 and into passageways 60a and 60b to perform, as mentioned, the function of cycling the next succeeding control unit 10b through the metering valve 14, and to supply fluid through passageway 65 for performing the job operation controlled by the next succeeding control unit 10b. It might be noted that if needle valve 14 in the next succeeding control unit 10b is closed, the cycle will stop at this time, until such valve 14 is released.

In the event the needle valve 14 in the next succeeding control unit is open, fluid flows into cavities 17, 24 and 47 in such next control unit, as in the first control unit 10a. The aforesaid operation between successive control units is always the same, i.e. pistons 26 and 36 move when sufficient pressure exists in cavities 17, 24 and 47, and fluid passes from cavity 34, passageways 30 and 60a into passageway 60b in the next succeeding control unit, and then through the needle valve 14 for further programing. Again, passage of fluid through port 65 performs the controlled job. The next succeeding control unit may be the final unit, as shown in the drawing, or may be one of many other intermediate control units.

Referring now to the remaining fluid flow from cavity or passageway 30, such will flow, through passageway 63a—63b, back to space 56, serving as an exhaust cavity, in the preceding control unit, thereupon moving piston 59 towards bumper 54 and the farthest portion of piston 69 into contact with a wall of the unit. As piston 59 moves towards bumper 54, piston 49 moves away from its seated relationship with seat 51, permitting fluid trapped in cavities 17, 24 and 47 to pass through exhaust duct 70. Piston 26 also moves, by reason of the aforesaid release of pressure, from its seated relationship by gasket 26b with gasket 35, permitting any remaining fluid in cavity 30 to exhaust through ducts 42 and 70.

In the event a disk 61 is installed in the duct or passageway 63a—63, fluid will not flow from the passageway 30 to the next preceding control unit, meaning that cavities 17, 24 and 47 will not exhaust in such control unit, in the manner discussed above, but will remain in a "hold" position. Such a result is an important factor provided by the invention, in that with "holding" action, a particular job operation can be maintained for further operations, with a subsequent release. In other words, job a can be maintained, jobs b, c and d programed and completed, and, thereafter, job a released, as desired.

In order to release a "hold" condition, passageway or duct 87 is employed. More specifically, and by way of example, some of the fluid pressure which would ordinarily be introduced into duct or passageway 11 can be diverted into passageway or duct 87, causing a "shot" of fluid pressure into the space 56. When the latter occurs, normal exhaust procedure is initiated, i.e. pistons 59 and 69 move in opposite directions, and piston 49 moves against the spring 46, causing a passageway to the exhaust duct 70 and, thereby, exhausting cavities 17, 24 and 47. Again, as before, with the exhausting of cavity 24, piston 26 moves to the position of FIG. 1, permitting the exhausting of cavity 30 through the exhaust path defined by passageway 42 and 70. It might be noted that with the use of an hydraulic fluid, exhaust is achieved into a reservoir (not shown), while, by way of further example, when pressurized air is used, exhaust may be into the atmosphere.

As a matter of restatement, automatic operation is simply achieved through use of pivotal lever 27 and associated plunger 27a, the latter moving the pin member 41 and permitting the already existing fluid pressure (from the outside supply) in the cavity 34 to flow into passageway 30, which serves as a control cavity, and to preform the job function in the next succeeding control unit and the exhaust function in the next preceding control unit. The last control unit 10c performs as any interconnected control unit would perform, i.e. serves to initiate the job controlled by the next succeeding control unit (the first control unit in this instance), as well as to perform an exhaust function in the next preceding control unit 10b. In other words, a conduit or the like (shown by broken lines in FIG. 2) introduces fluid pressure from control unit 10c into the passageway 11 in the control unit 10a. As usual, the last control unit also controls a job function through initiation from control unit 10b. It must be remembered that with automatic as well as semiautomatic operation, the needle valve 14 plays an important part insofar as the timing function is concerned.

As to semiautomatic operation, i.e. the systematic operation of each control unit until the last control unit 10c is reached, the sequence is terminated in that such last control unit 10c does not recycle programing. While the last control unit 10c does perform an exhaust function for the next preceding control unit, an arrangement is provided for permitting the exhausting of the last control unit 10c, i.e. the duct or passageway 85 which communicates between passageway 30 and space 56. In this connection, a plug (not shown) is normally in duct 85 during automatic operation; however, such plug is opened, to the extent desired, during semiautomatic operation to permit "bleeding" of fluid pressure from passageway 30 to space 56 and, therefore, the ultimate exhausting of control unit 10c through the discussed exhaust procedure. The rapid exhausting of control unit 10c is probably not desired in that such could interfere with the job function of 10c, and for this reason a "bleeding" effect is more wanted.

With reference to the openings 80 in all of the control units, such are provided to permit a single communication path between the control units and, under an emergency situation, a "shot" of fluid through such openings 80 causes pistons 69, 59 and 47 to move upwardly, achieving an exhaust condition through the exhaust arrangement described above. In other words, the introduction of the emergency air releases the seal in all control units, and, thereby, achieves an emergency stop.

The invention provides an important programer for any desired sequence of operations. In that the programer is defined by a series of individual interconnected control units, any number of control functions can be effectively coordinated in a minimum of time, considering the similarity of each of the control units. Importantly, the programer of the invention further permits a "holding" feature in one or more control units and, thereby, affords varied end control results. As should be evident, the aforesaid "hold" is readily and simply achieved during the assembly of the control units making the programer. Additionally, the invention is such that automatic or semiautomatic operation is readily achieved and, additionally, for safety reasons, or otherwise, an emergency stop feature is provided.

The programer described above is susceptible to various changes within the spirit of the invention, as proportioning, the use of different gasket means or the like. Thus, the above description should be considered illustrative and not as limiting the scope of the following claims:

I claim:

1. A programer comprising a first control unit, a second control unit interconnecting said first control unit interconnecting said first control unit and next preceding said first control unit, a third control unit interconnecting said first control unit and next succeeding said first control unit, and a source of pressurized fluid communicating with each of said control units; said first, said second and said third control units, each comprising a control cavity, an exhaust cavity, and an inlet cavity, a passageway communicating between said control cavity of said first control unit and said inlet cavity of said third control unit; a passageway communicating between said control cavity of said first control unit and said exhaust cavity of said second control unit; a passageway communicating between said control cavity of said second control unit and said inlet cavity, of said first control unit; a passageway communicating between said control cavity of said third control unit and said exhaust cavity of said first control unit; and a job control port in at least said first control unit, and communicating with said inlet cavity of said first control unit, where said first, said second and said third control units are each operatively responsive to passage of said pressurized fluid therebetween from said source, and where a holding means selectively interrupts fluid flow from one control unit to the next preceding control unit to maintain said next preceding control unit at a given operative condition.

2. The programer of claim 1 where said source of pressurized fluid communicates with another cavity in each control unit having a slidable piston, and where the force of pressurized fluid from said inlet cavity in each control unit selectively moves each piston and releases the pressurized fluid from said another cavity into said control cavity.

3. The programer of claim 1 where still another cavity is provided in each control unit having a slidable piston normally in a sealed relationship with respect to an outlet duct, and where the force of pressurized fluid from the next succeeding control unit selectively moves said piston to unseal said relationship and to permit exhaust of pressurized fluid.

4. The programer of claim 1 where said control cavity of said third control unit communicates with said inlet cavity of said second control unit.

5. A programer comprising a first control unit, a second control unit interconnecting said first control unit and next preceding said first control unit, a third control unit interconnecting said first control unit and next succeeding siad first control unit, and a source of pressurized fluid communicating with each of said control units; said first, said second and said third control units, each comprising a control cavity, an exhaust cavity and an inlet cavity; a passageway communicating between said control cavity of said first control unit and said inlet cavity of said third control unit; a passageway communicating between said control cavity of said first control unit and said exhaust cavity of said second control unit; a passageway communicating between said control cavity of said second control unit and said inlet cavity of said first control unit; a passageway communicating between said control cavity of said third control unit and said exhaust cavity of said first control unit; and a job control port in at least said first control unit, and communicating with said inlet cavity 12, etc. of said first control unit where said first, said second and said third control units are each operatively responsive to passage of said pressurized fluid therebetween from said source, and where a blocking means 61 is selectively disposed in the passageway between said control cavity of any control unit and said exhaust cavity 56, etc. of the next preceding control unit 6. A programer comprising a first control unit, a second control unit interconnecting said first control unit and next preceding said first control unit, a third control unit interconnecting said first control unit and next succeeding said first control unit, and a source of pressurized fluid communicating with each of said control units, said first, said second and said third control units, each comprising a control cavity, an exhaust cavity and an inlet cavity; a passageway communicating between said control cavity of said first control unit and said inlet cavity of said third control unit; a passageway communicating between said control cavity of said first control unit and said exhaust cavity of said second control unit; a passageway communicating between said control cavity of said second control unit and said inlet cavity of said first control unit; a passageway communicating between said control cavity of said third control unit and said exhaust cavity of said first control unit; and a job control port in at least said first control unit, and communicating with said inlet cavity of said first control unit, where said first, said second and said third control units are each operatively responsive to passage of said pressurized fluid therebetween from said source, and where a selectively operable exhaust means is provided between said control cavity and said exhaust cavity in said third control unit.